(12) United States Patent
van Greunen et al.

(10) Patent No.: US 10,185,666 B2
(45) Date of Patent: Jan. 22, 2019

(54) ITEM-WISE SIMULATION IN A BLOCK CACHE WHERE DATA EVICTION PLACES DATA INTO COMPARABLE SCORE IN COMPARABLE SECTION IN THE BLOCK CACHE

(71) Applicant: Facebook, Inc., Menlo Park, CA (US)

(72) Inventors: Jana van Greunen, Woodside, CA (US); Huapeng Zhou, Union City, CA (US); Linpeng Tang, Princeton, NJ (US)

(73) Assignee: Facebook, Inc., Menlo Park, CA (US)

( * ) Notice: Subject to any disclaimer, the term of this patent is extended or adjusted under 35 U.S.C. 154(b) by 10 days.

(21) Appl. No.: 14/970,034

(22) Filed: Dec. 15, 2015

(65) Prior Publication Data

US 2017/0168958 A1    Jun. 15, 2017

(51) Int. Cl.
| | | |
|---|---|---|
| *G06F 12/12* | (2016.01) | |
| *G06F 12/121* | (2016.01) | |
| *G06F 12/127* | (2016.01) | |
| *G06F 12/0873* | (2016.01) | |
| *G06F 12/0875* | (2016.01) | |

(52) U.S. Cl.
CPC ........ *G06F 12/121* (2013.01); *G06F 12/0873* (2013.01); *G06F 12/0875* (2013.01); *G06F 12/12* (2013.01); *G06F 12/127* (2013.01); *G06F 2212/1021* (2013.01)

(58) Field of Classification Search
CPC combination set(s) only.
See application file for complete search history.

(56) References Cited

U.S. PATENT DOCUMENTS

| | | | |
|---|---|---|---|
| 5,404,485 A | 4/1995 | Ban | |
| 5,822,759 A * | 10/1998 | Treynor | ................ G06F 12/122 |
| | | | 711/134 |
| 5,991,753 A | 11/1999 | Wilde | |
| 6,272,598 B1 * | 8/2001 | Arlitt | ................ G06F 17/30902 |
| | | | 707/E17.12 |

(Continued)

OTHER PUBLICATIONS

U.S. Appl. No. 14/970,027 by van Greunen, J., et al., filed Dec. 15, 2015.

(Continued)

*Primary Examiner* — Ann J Lo
*Assistant Examiner* — Chie Yew
(74) *Attorney, Agent, or Firm* — FisherBroyles LLP

(57) ABSTRACT

Several embodiments include a method of operating a cache appliance comprising a primary memory implementing an item-wise cache and a secondary memory implementing a block cache. The cache appliance can emulate item-wise storage and eviction in the block cache by maintaining, in the primary memory, sampling data items from the block cache. The sampled items can enable the cache appliance to represent a spectrum of retention priorities. When storing a pending data item into the block cache, a comparison of the pending data item with the sampled items can enable the cache appliance to identify where to insert a block containing the pending data item. When evicting a block from the block cache, a comparison of a data item in the block with at least one of the sampled items can enable the cache appliance to determine whether to recycle/retain the data item.

13 Claims, 12 Drawing Sheets

(56) References Cited

U.S. PATENT DOCUMENTS

| | | | |
|---|---|---|---|
| 6,425,057 B1 | 7/2002 | Cherkasova et al. | |
| 7,107,321 B1* | 9/2006 | Shaffer | G06F 12/0888 709/213 |
| 7,480,749 B1* | 1/2009 | Danilak | G06F 3/0656 710/52 |
| 8,566,553 B1 | 10/2013 | Wang et al. | |
| 8,606,823 B1* | 12/2013 | Banerjee | G06F 17/3048 707/802 |
| 9,213,721 B1 | 12/2015 | Whitney et al. | |
| 9,274,956 B1 | 3/2016 | Salyers | |
| 2003/0110190 A1 | 6/2003 | Achiwa et al. | |
| 2006/0041720 A1* | 2/2006 | Hu | G06F 12/0811 711/136 |
| 2008/0288717 A1* | 11/2008 | Torabi | G06F 12/0246 711/103 |
| 2009/0100224 A1* | 4/2009 | Wang | G06F 12/0804 711/118 |
| 2009/0259919 A1 | 10/2009 | Kilzer | |
| 2009/0300079 A1 | 12/2009 | Shitomi | |
| 2010/0095053 A1 | 4/2010 | Bruce et al. | |
| 2010/0325383 A1 | 12/2010 | Karamcheti | |
| 2011/0010489 A1 | 1/2011 | Yeh et al. | |
| 2011/0040729 A1* | 2/2011 | Ito | G06F 3/0619 707/654 |
| 2011/0113201 A1 | 5/2011 | Midda et al. | |
| 2011/0138131 A1* | 6/2011 | Regni | G06F 17/30221 711/133 |
| 2011/0276781 A1 | 11/2011 | Sengupta et al. | |
| 2011/0307683 A1* | 12/2011 | Spackman | G06F 17/30156 711/216 |
| 2012/0017043 A1* | 1/2012 | Aizman | G06F 11/1076 711/114 |
| 2012/0023319 A1 | 1/2012 | Chin et al. | |
| 2012/0089700 A1 | 4/2012 | Safruti et al. | |
| 2012/0260024 A1 | 10/2012 | Haywood | |
| 2013/0173872 A1 | 7/2013 | Terek et al. | |
| 2013/0215756 A1* | 8/2013 | Jeon | H04L 67/2852 370/238 |
| 2013/0346672 A1 | 12/2013 | Sengupta et al. | |
| 2014/0032817 A1 | 1/2014 | Bux | |
| 2014/0032831 A1 | 1/2014 | Asamoto et al. | |
| 2014/0075149 A1 | 3/2014 | Pike | |
| 2014/0229654 A1 | 8/2014 | Goss et al. | |
| 2014/0245109 A1* | 8/2014 | Yim | G06F 12/0246 714/773 |
| 2014/0250258 A1* | 9/2014 | Cheng | G06F 12/0246 711/103 |
| 2014/0379965 A1* | 12/2014 | Gole | G06F 12/0246 711/103 |
| 2015/0356020 A1 | 12/2015 | Desai et al. | |
| 2017/0041428 A1* | 2/2017 | Katsev | H04L 67/2852 |
| 2017/0168944 A1 | 6/2017 | van Greunen et al. | |
| 2017/0168956 A1 | 6/2017 | van Greunen et al. | |

OTHER PUBLICATIONS

U.S. Appl. No. 14/970,041 by van Greunen, J., et al., filed Dec. 15, 2015.

Non-Final Office Action dated Aug. 21, 2017, for U.S. Appl. No. 14/970,041, of Van Greunen, J., et al., filed Dec. 15, 2015.

Final Office Action dated Sep. 26, 2017, for U.S. Appl. No. 14/970,027, of Van Greunen, J., et al., filed Dec. 15, 2015.

Non-Final Office Action dated May 17, 2017, for U.S. Appl. No. 14/970,027, of Van Greunen, J., et al., dated Dec. 15, 2015.

Silvano Maffeis. 1993. Cache management algorithms for flexible filesystems. SIGMETRICS Perform. Eval. Rev. 21, 2 (Dec. 1993), 16-25. D01=10.1145/174215.174219 http://doi.acm.org/10.1145/174215.174219.

* cited by examiner

ITEM-WISE SIMULATION IN A BLOCK CACHE WHERE DATA EVICTION PLACES DATA INTO COMPARABLE SCORE IN COMPARABLE SECTION IN THE BLOCK CACHE

BACKGROUND

A content delivery network (CDN) is a caching system comprising one or more cache appliances (e.g., computer servers or other computing machines) that are accessible to serve data to clients in a wide area network (WAN), for example, the Internet. A cache appliance can serve data temporarily stored therein on behalf of a data center or an application service system. Multiple cache appliances can be distributed in edge point of presences (PoPs). Popular content, e.g., a video or photo that is requested by many users, is cached as close to the users as possible. When a user requests content that is already cached, such access can be referred to as a "cache hit." It is important to have a high cache hit rate (e.g., per item and per byte), because it lowers the latency of delivering the content to the user, and also saves the bandwidth to fetch the requested content all the way from a source data center.

In some cases, a cache appliance has both a primary data storage and a secondary data storage. For example, a cache appliance can have a random access memory (RAM) and a flash drive. The flash drive may have a much higher capacity than the RAM. In some cases, flash drives have inherent limitations to operate on a block basis. For example, a typical driver of a flash drive may expose 256 MB blocks to a processor of the cache appliance. A block in the flash drive, once written, would then need to be entirely erased before any byte in the block can be changed. The flash drive itself is not aware of data items/objects (e.g., an image file) it stores. Each block has a limited number of erase cycles before it wears out physically. A large number of writes/erase operations would slow down the latency to read items from the cache appliance.

Figure 1:
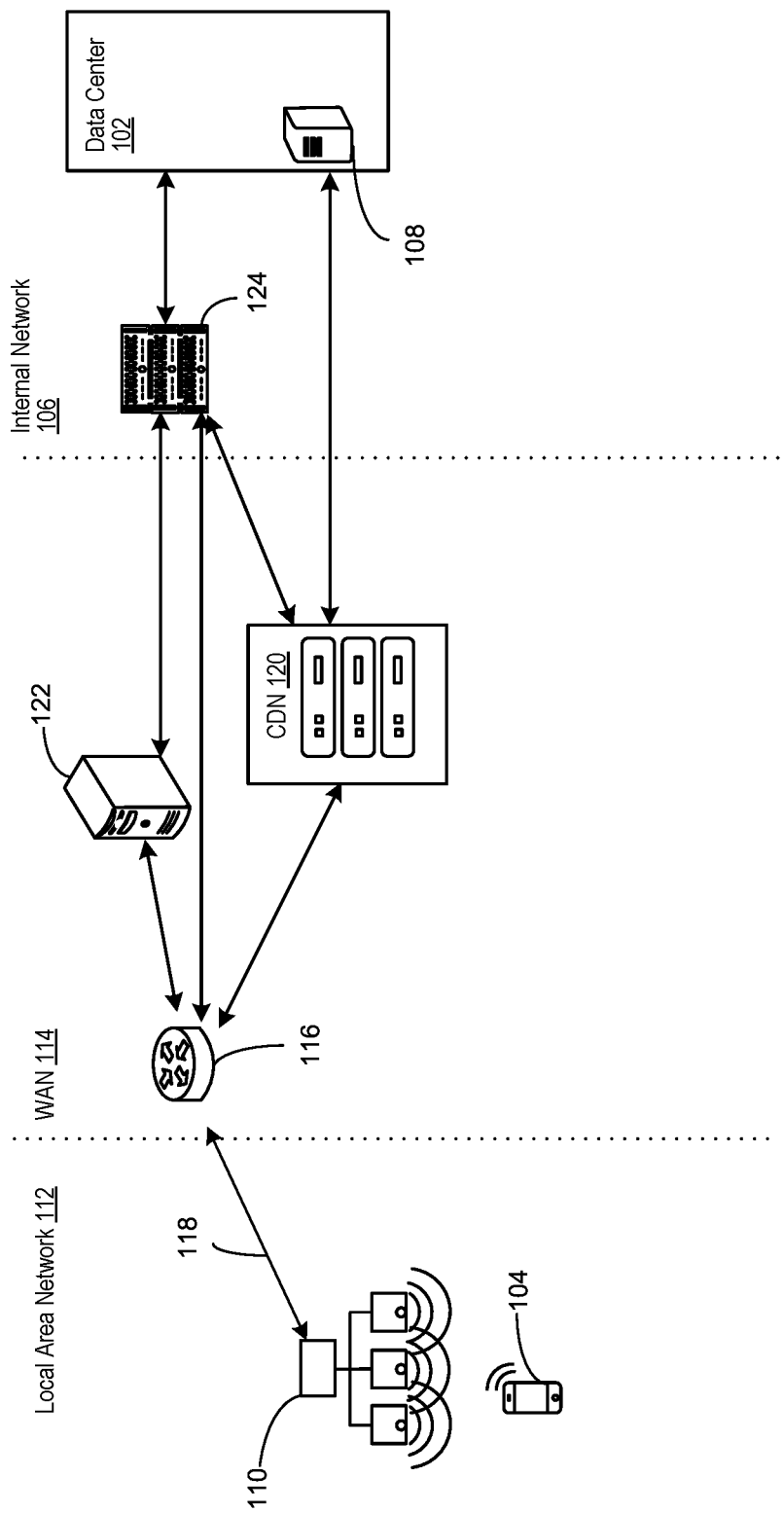
FIG. 1 is a block diagram illustrating a network environment in which a caching system, in accordance with various embodiments, can be implemented.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Embodiments are described to include a caching system, e.g., in a CDN. For example, the caching system can include a cache appliance having a primary memory (e.g., RAM or other system memory) and a secondary memory (e.g., a flash drive, other solid-state drive, other block level storage drive, etc.). At least a portion of the primary memory can be used to implement an item-wise cache (e.g., an item-wise least recently used (LRU) cache). This portion of the primary memory can be shared by processes in the cache appliance. The secondary memory can implement a block cache. In several embodiments, the memory capacity of the block cache is significantly larger than the memory capacity of the item-wise cache in the primary memory.

In several embodiments, the caching system utilizes the item-wise cache as a staging area of the block cache. For example, when the item-wise cache is full or substantially full, the caching system can select one or more data items within the item-wise cache as one or more item eviction candidates upon eviction from the item-wise cache. The caching system can evaluate an item eviction candidate for potential inclusion into the block cache.

A block cache stores data in units of constant-sized blocks and exposes access to the blocks without a filesystem. It can be advantageous for the block cache to emulate item-wise caching. For example, cache lookup requests to the caching system are based on data item requests, and hence item-wise caching or at least emulated item-wise caching would be more in-line with cache lookup activities. When the caching algorithm of a caching system is more in-line with patterns of cache lookup activities, cache hit rate of the caching system would thus increase.

Item-wise caching can be done by maintaining an ordered queue of data items. However, this ordered queue, if maintained for all data items in the block cache, may consume too much memory and processing power to be feasible. Hence in several embodiments, the caching system can select a subset of data items by performing a consistent hash on some attributes of the data items. Through this process, the caching system can select, as sample items, a small percentage of all of the data items stored in the block cache.

The sample items can be ordered/queued based on a caching algorithm (e.g., multiple-queue caching, segmented least recently used (SLRU) caching, 2LRU, Arc, GDFS, etc.). A "caching algorithm" provides instructions to manage a cache of information (e.g., data items) stored in a data storage. The caching algorithm chooses which data item to discard to make room for new data, for example, by ordering the data items in the cache in a certain way such that a candidate for eviction is readily identifiable.

In several embodiments, the caching algorithm is modified such that, other than ordering the sample items, the caching algorithm also computes a comparable metric e.g., last access time, item size, access frequency, or any combination thereof) (for each of the sample items. The comparable metrics of the sample items produced by the caching algorithm can thus be used to estimate retention priorities of data items in the block cache. For example, the comparable metric can be a numeric value that can be compared against another comparable metric to determine the order between the two comparable metrics.

The caching system can be configured to evict a constant number of blocks from the block cache whenever the block cache is full or substantially full (e.g., according to a threshold percentage of the entire capacity). The caching system can select a candidate block in the block cache for eviction. The caching system can select the candidate block as a block containing one of the sample items that has the lowest retention priority (e.g., according to the comparable metric). This sample item can be referred to as the "comparable item sample."

In several embodiments, the caching system maintains one or more block buffers to temporarily store data items that are to be included in the block cache. Once the block buffers are full or substantially full, the data items in the block buffers are written into the block cache. This may be done, for example, to minimize the number of write operations into the block cache, and thus extending the lifetime of the secondary storage. In case of block eviction, all of the data items within the candidate block would be evicted and/or replaced, unless one or more data items are saved back into a block buffer for a to-be-added block.

Because of the mechanism to re-enter one or more data items back into the block buffer, the amount of data evicted per block eviction may vary. In several embodiments, the caching system can utilize the sample items to statistically approximate a target eviction size of data to be evicted per block eviction. For example, the sample items can be used to determine which item(s) from the candidate block for eviction is saved back into the block buffer. In several embodiments, when selecting the comparable item sample from the sample items, the caching system selects a sample item of the lowest retention priority (e.g., according to its comparable metric) that has approximately the target size (e.g., the target eviction size multiplied by the sampling rate). When the candidate block is evicted, any data item that has a retention priority lower than that of the comparable item sample is evicted. Any item that has a retention priority higher than that of the comparable item sample is placed back into one of the block buffers. This mechanism advantageously ensures that, statistically, approximately the expected target eviction size would be free from the block cache.

The data items that are "saved" from eviction (e.g., copied out of the candidate block for eviction) may not have similar comparable metrics from each other. Rather than group the data items all into the same block, the eviction queue can keep a number of different block types to insert all of the items with similar metrics to the same block in the block cache.

Turning now to the figures, FIG. 1 is a block diagram illustrating a network environment 100 in which a caching system, in accordance with various embodiments, can be implemented. The network environment 100 can include one or more network appliances, equipment and servers for delivering content from a data center 102 to, for example, an end-user device. The data center 102 can include one or more computing devices providing data content for a content provider system (e.g., a social networking system, an application service system, a social media system, or any combination thereof). The data center 102 can be part of an internal network 106 of the content provider system. The data center 102 can include an origination server 108. The origination server 108 can store data content made accessible through an application service.

The end-user device 104 can be connected to a local hotspot 110. The local hotspot 110 can host a local area network (LAN) 112. The local hotspot 110 can also provide access to a wide area network (WAN) 114 (e.g., via an Internet service provider (ISP) router 116). The local hotspot 112 can be connected to the ISP router 116 via a backhaul link 118. The WAN 114 can be an external network from the content provider system. The WAN 114 can be the Internet.

A content request can be generated at the end-user device 104. When the content request from the end-user device 104 arrives at the ISP router 116, the ISP router 116 can check with a content delivery network (CDN) 120 to determine whether the CDN 120 has cached a copy of the requested data item. The CDN 120 can implement a caching system, according to various embodiments, to store at least a portion of the data content of the data center 102. For example, the caching system can select what data items to store based on the popularity of data items requested.

When the CDN 120 has a copy of the requested data item, then the CDN 120 can fulfill the content request by delivering the requested content object to the end-user device 104 without passing the content request to the data center 102. When the CDN 120 does not have a copy, then the content request is propagated along the WAN 114 to the internal network 106 of the content provider system to fetch the requested content object from, for example, the origination server 108. The CDN 120 can then cache the requested content object once it is returned from the origination server 108. In some embodiments, other caching network appliances (e.g., a caching network appliance 122) can be coupled to the ISP router 116. In these embodiments, the caching network appliance 122 can serve the same functionalities as the CDN 120 to fulfill the content request.

An edge point of presence (PoP) 124 can be part of the internal network 106 of the content provider system. The edge PoP 124 can act as a proxy for the data center 102 to serve data content to end-user devices (e.g., the end-user device 104) connected to the WAN 114. In some embodiments, an edge PoP is setup closer to groups of users, for example, based on geographical locations (e.g., countries). For example, the edge PoP 124 can serve data content to the caching network appliance 122 and/or the ISP router 116, and thus indirectly to the end-user device 104. In some embodiments, the caching system, according to various embodiments, can be implemented in the edge PoP 124.

In some embodiments, when the CDN 120 that does not have a copy of the requested content object, the CDN 120 can request a copy from the edge PoP 124. In some embodiments, when the CDN 120 that does not have a copy of the requested content object, the CDN 120 can request a copy directly from the data center 102. In some embodiments, the edge PoP 124 can be pre-populated with data items from the data center 102. For example, the pre-population of data items may be based on predictive analytics and data accesses history analytics. In several embodiments, at least one of the ISP router 116, the caching network appliance 122, the CDN 120, the edge PoP 124, the origination server 108, and the local hotspot 112 can implement the caching system according to various embodiments.

Figure 2:
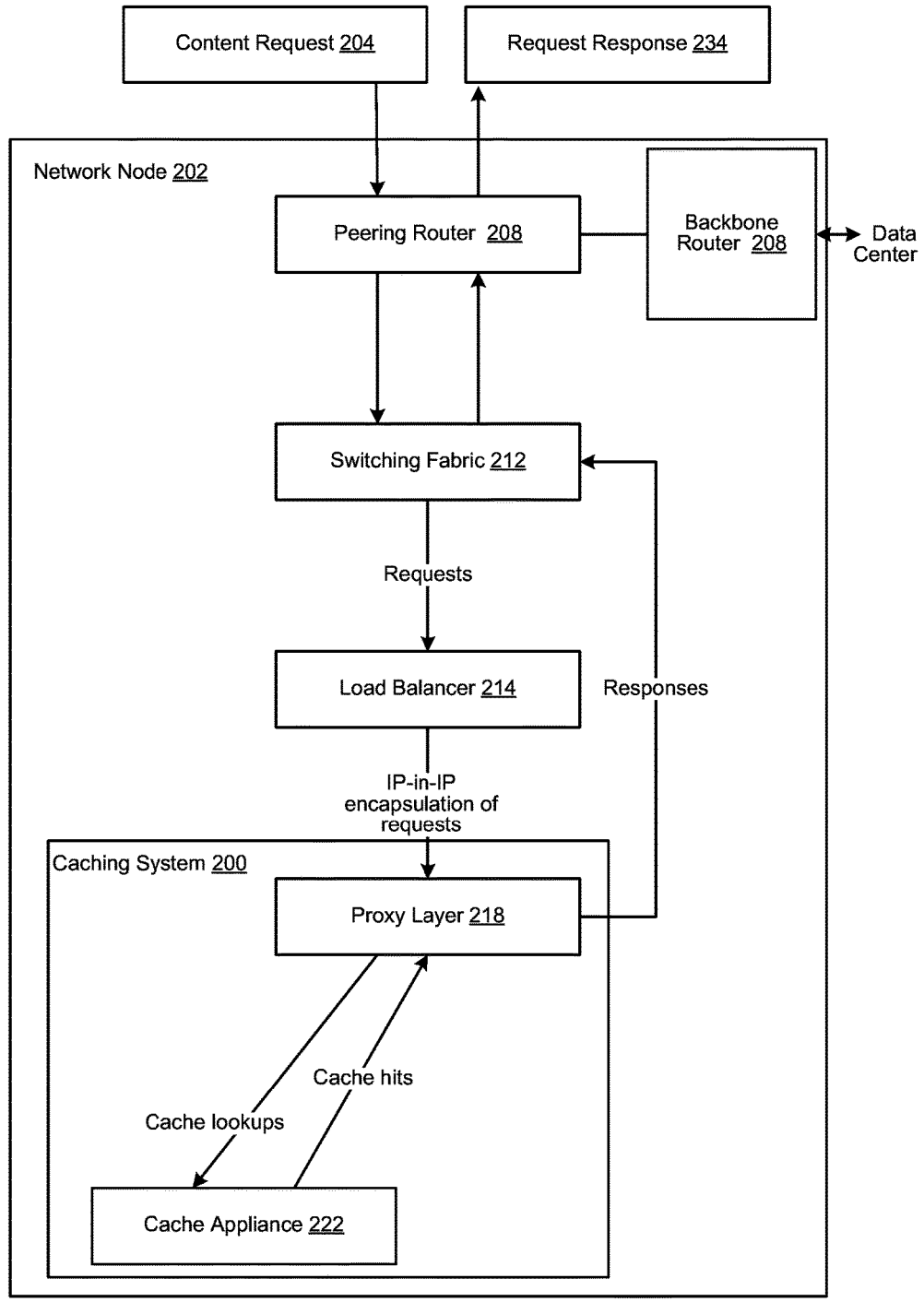
FIG. 2 is an example of a control flow diagram illustrating a method of servicing a content request at a caching system, in accordance with various embodiments.

FIG. 2 is an example of a control flow diagram illustrating a method of servicing a content request at a caching system 200, in accordance with various embodiments. The caching system 200 can be configured to provide temporary data storage for data content from a content provider system.

A network node 202 (e.g., the edge PoP 124 or the CDN 120 of FIG. 1) in a WAN (e.g., the WAN 114 of FIG. 1) can receive a content request 204 via a peering router 208 from a requesting client (e.g., the end-user device 104 of FIG. 1). The peering router 208 can be coupled to a backbone router 210 and a switching fabric 212 (e.g., comprising one or more fabric switches). The backbone router 210 can be connected to an internal network (e.g., the internal network 126 of FIG. 1) of the content provider system. The switching fabric 212 can pass the content request 204 to a load balancer 214. In some embodiments, the switching fabric 212 splits ingress traffic among different load balancers. In turn, the load balancer 214 can identify the caching system 200 to fulfill the content request 204.

In some embodiments, the caching system 200 includes a proxy layer 218 that manages one or more cache appliances (e.g., a cache appliance 222). The proxy layer 218 can be implemented by one or more front-end servers or as a process implemented on the cache appliance 222. The load balancer 214 can have access to proxy layers of different caching systems. The load balancer 214 can split its traffic amongst different caching systems. The proxy layer 218 can convert the content request 204 into one or more cache lookup requests to at least one of the cache appliances.

The cache appliance 222 can implement a cache service application and a multilevel cache. For example, the multilevel cache can include a primary memory cache (e.g., implemented in a system memory module) and a secondary memory cache (e.g., implemented in one or more secondary data storage devices). In some embodiments, the primary memory cache is implemented as a least recently used (LRU) cache. In some embodiments, the secondary memory cache is implemented as an LRU cache as well.

A primary memory or a primary data storage refers to a data storage space that is directly accessible to a central processing unit (CPU) of the cache appliance 222. A secondary memory or a secondary data storage refers to a data storage space that is not under the direct control of the CPU. In one example, the primary memory is implemented in one or more RAM modules and/or other volatile memory modules and the secondary memory is implemented in one or more persistent data storage devices. In several embodiments, the primary memory cache is an item-wise cache (e.g., content of the cache can be accessed by data item/object identifiers) and the secondary memory cache is a block level cache (e.g., content of the cache can only be accessed by data block identifiers). A data block is of a pre-determined size.

In response to a cache lookup request, the cache appliance 222 can determine whether the requested data item associated with the cache lookup request is cached in its memory. The requested data item may be in the primary memory cache or the secondary memory cache. The cache service application can determine whether the requested data item is available in the caching system 200 by looking up the requested data item in the primary memory cache. If the requested data item is not found in the primary memory cache, the cache service application can look up the requested data item in an index table of data items in the secondary memory cache.

When the requested data item is available, the cache service application can send a cache hit message containing the requested data item back to the proxy layer 218. When the requested data item is unavailable, the cache service application can send a cache miss message back to the proxy layer 218. When the cache appliance 222 responds to the proxy layer 218 with a cache miss message, the proxy layer 218 can dynamically request to fetch the requested data item from a host server (e.g., the origination server 108 of FIG. 1). For example, the proxy layer 218 can contact the host server via the backbone router 210. In some embodiments, the proxy layer 218 can respond to the content request 204 directly to the switching fabric 212 (e.g., the response can bypass the load balancer 214). A response message 230 containing the requested data item can then be returned to the requesting device that issued the content request 204.

Figure 3:
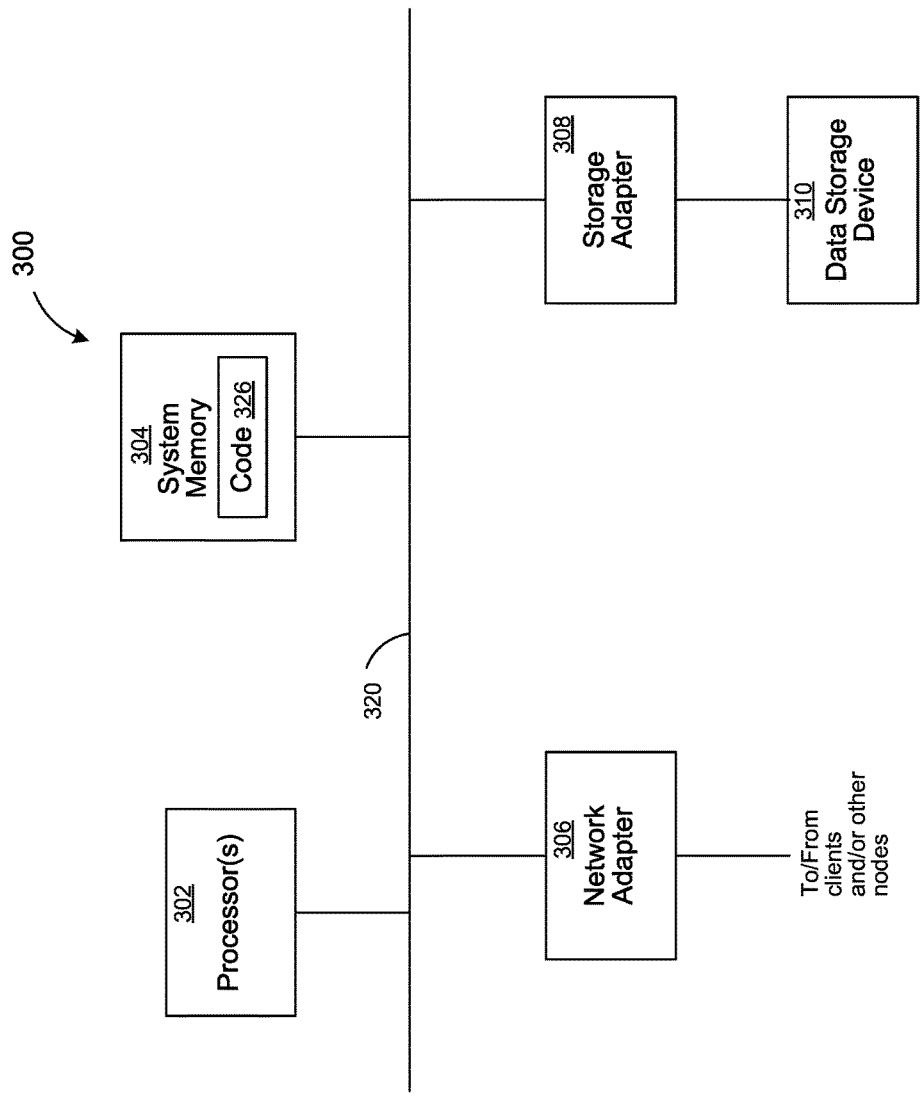
FIG. 3 is a block diagram illustrating a cache appliance, in accordance with various embodiments.

FIG. 3 is a block diagram illustrating a cache appliance 300, in accordance with various embodiments. The cache appliance 300 can include one or more processors 302, a system memory 304, a network adapter 306, a storage adapter 308, and a data storage device 310. The one or more processors 302 and the system memory 304 can be coupled to an interconnect 320. The interconnect 320 can be one or more physical buses, point-to-point connections, virtual connections, bridges, adapters, controllers, or any combination thereof.

The processors 302 are the central processing unit (CPU) of the cache appliance 300 and thus controls the overall operation of the cache appliance 300. In certain embodiments, the processors 302 accomplish this by executing software or firmware stored in the system memory 304. The processors 302 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or any combination of such devices.

The system memory 304 is or includes the main memory of the cache appliance 300. The system memory 304 can provide run-time data storage shared by processes and applications implemented and/or executed by the one or more processors 302. The system memory 304 can include at least a random access memory (RAM) module or other volatile memory. In some embodiments, the system memory 304 can include other types of memory. In use, the system memory 304 may contain a code 326 containing instructions to execute one or more methods and/or functional/logical components described herein.

Also connected to the processors 302 through the interconnect 320 are the network adapter 306 and the storage adapter 308. The network adapter 306 provides the cache appliance 300 with the ability to communicate with remote devices, over a network and may be, for example, an Ethernet adapter or Fibre Channel adapter. The network adapter 306 may also provide the cache appliance 300 with the ability to communicate with other computers (e.g., in the same caching system/network). The storage adapter 308 enables the cache appliance 300 to access a persistent storage (e.g., the data storage device 310). The storage adapter 308 may be, for example, a Fibre Channel adapter or small computer system interface (SCSI) adapter. The storage adapter 308 can provide block level access to the data storage device 310 (e.g., flash memory, solid state memory, other persistent data storage memory, etc.). In some embodiments, the storage adapter 308 can provide only block level access to the data storage device 310.

The code 326 stored in system memory 304 may be implemented as software and/or firmware to program the processors 302 to carry out actions described above. In certain embodiments, such software or firmware may be initially provided to the cache appliance 300 by downloading it from a remote system through the cache appliance 300 (e.g., via network adapter 306).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium (e.g., non-transitory medium) and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc. The term "logic", as used herein, can include, for example, programmable circuitry programmed with specific software and/or firmware, special-purpose hardwired circuitry, or a combination thereof.

Figure 4:
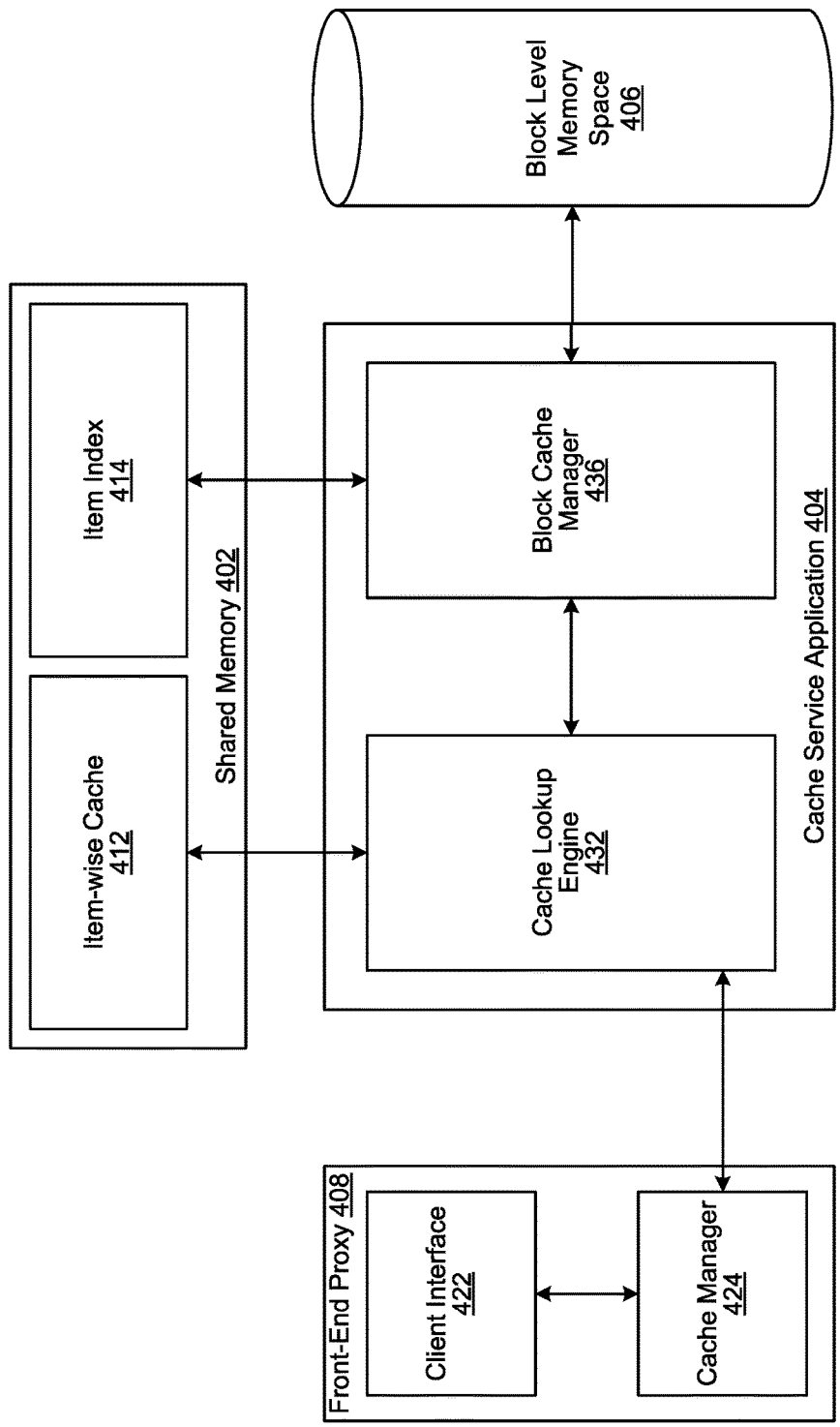
FIG. 4 is a block diagram illustrating functional and logical components of a cache appliance, in accordance with various embodiments.

FIG. 4 is a block diagram illustrating functional and logical components of a cache appliance 400, in accordance with various embodiments. The cache appliance 400 can be part of a content delivery network that provides temporary data storage, for one or more frequently requested data items, in one or more edge point of presences in a wide area network. The cache appliance 400 can include a shared memory 402 (e.g., hosted in the system memory 304 of FIG. 3), a cache service application 404 (e.g., implemented by the one or more processors 302 of FIG. 3), and a block level memory space 406 (e.g., hosted in the data storage device 310 of FIG. 3). The cache appliance 400 can include or be coupled to a front-end proxy 408 (e.g., implemented by the one or more processors 302 of FIG. 3 or hosted by a front-end device separate from the cache appliance 400). The cache appliance 400 can be the cache appliance 300 of FIG. 3.

The cache appliance 400 can implement an item-wise cache 412 in the shared memory 402. The cache appliance 400 can also implement an item index 414 that stores one or more block pointers corresponding to one or more data items (e.g., data objects and/or data files that have variable sizes). Each of the block pointers can point to one or more blocks in the block level memory space 406. In some embodiments, size of a data item is configured to be always smaller than a block, for example, by chunking a data item into sections that is at maximum the size of a block. The item-wise cache 412 can be arranged for lookup by item identifier or by item attribute (e.g., creation date, access date, size, type).

The item index 414 can maintain a list of data items stored in the block level memory space 406. In some embodiments, the data items are encrypted when stored in the block level memory space 406. In these embodiments, the item index 414 can be configured to store one or more encryption keys to access the encrypted blocks in the block level memory space 406. For example, each block or each portion in each block in the block level memory space 406 can be encrypted via the Advanced Encryption Standard (AES). The item index 414 can store the AES keys used to decrypt the blocks or portions of the blocks.

A client interface 422 of the front-end proxy 408 can receive a content request from an external device. A request manager 424 of the front-end proxy 408 can then generate a cache lookup request based on the content request. The cache lookup request is sent to a cache lookup engine 432 of the cache service application 404. The cache lookup engine 432 can respond to cache lookup requests from the request manager 434. The cache service application 404 can respond to a cache lookup request with a cache hit message (e.g., containing the requested data item) or a cache miss message. The cache lookup engine 432 can first lookup whether the requested data item is in the item-wise cache 412. If not, the cache lookup engine 432 can look up, via a block cache management engine 436, whether the requested data item is in the block level memory space 406 by looking up the item index 414.

In some embodiments, the block cache management engine 436 is configured to update the item index 414 whenever one or more new data items are stored in the block level memory space 406. The block cache management engine 436 can also be configured to operate a storage adapter (e.g., the storage adapter 308 of FIG. 3) to access input/output (I/O) of the block level memory space 406. For example, the block cache management engine 436 can write a new block into the block level memory space 406.

When the requested data item is available, the cache lookup engine 432 can send a cache hit message containing the requested data item back to the request manager 424. When the requested data item is unavailable, the cache lookup engine 432 can send a cache miss message back to the request manager 424. When the request manager 424 receives the cache hit message, the request manager 424 can cause the client interface 422 to respond to the content request.

In some embodiments, the block cache management engine 436 can store the item index 414 only in the shared memory 402 without backup to a secondary storage drive. In some embodiments, because the cache lookup engine 432 stores the item-wise cache 412 in the shared memory 402, when the cache service application 404 restarts (e.g., due to failure or error), the restarted cache service application 404 is capable of re-using the item-wise cache 412 from prior to the restart.

Functional/logical components (e.g., applications, engines, modules, and databases) associated with the cache appliance 400 can be implemented as circuitry, firmware, software, or other functional instructions. For example, the functional/logical components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logical components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logical components may operate individually and independently of other functional/logical components. Some or all of the functional/logical components may be executed on the same host device or on separate devices. The separate devices can be coupled through one or more communication channels (e.g., wireless or wired channel) to coordinate their operations. Some or all of the functional/logical components may be combined as one component. A single functional/logical component may be divided into sub-components, each sub-component performing separate method step or method steps of the single component.

In some embodiments, at least some of the functional/logical components share access to a memory space. For example, one functional/logical component may access data accessed by or transformed by another functional/logical component. The functional/logical components may be considered "coupled" to one another if they share a physical connection or a virtual connection, directly or indirectly, allowing data accessed or modified by one functional/logical component to be accessed in another functional/logical component. In some embodiments, at least some of the functional/logical components can be upgraded or modified remotely (e.g., by reconfiguring executable instructions that implements a portion of the functional/logical components). The systems, engines, or devices described may include additional, fewer, or different functional/logical components for various applications.

Figure 5:
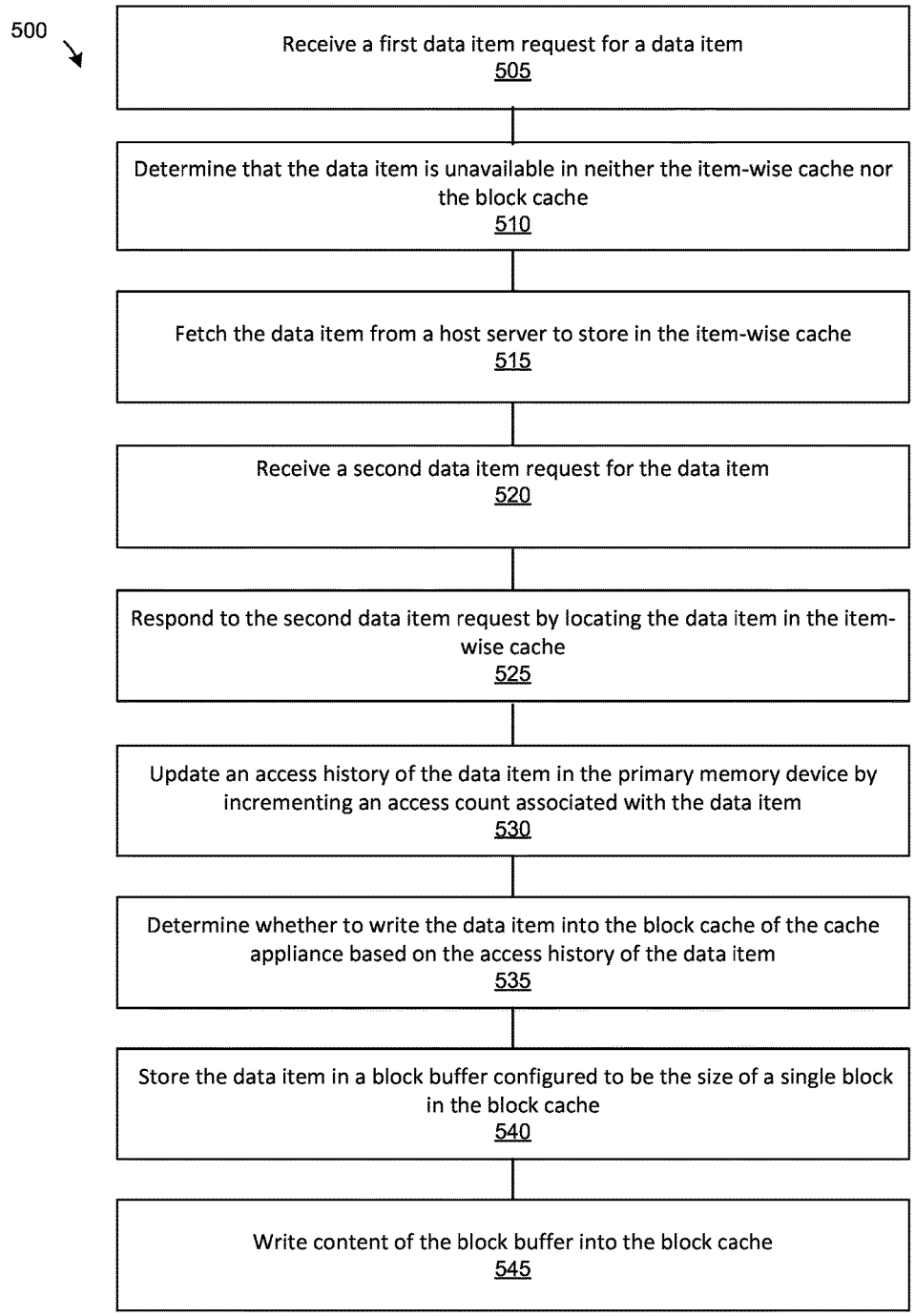
FIG. 5 is a flow chart illustrating a method of operating a multi-tier cache appliance to process a cache lookup request using an item-wise cache as a staging area, in accordance with various embodiments.

FIG. 5 is a flowchart illustrating a method 500 of operating a multi-tier cache appliance (e.g., the cache appliance 300 of FIG. 3 and/or the cache appliance 400 of FIG. 4) to process a cache lookup request using an item-wise cache as a staging area, in accordance with various embodiments. In some embodiments, the multi-tier cache appliance is considered "multi-tier" because it implements at least the item-wise cache in a primary data storage (e.g., RAM memory) and a block cache in a secondary data storage (e.g., solid-state memory). The item-wise cache can be configured as a staging area for the block cache.

At step 505, the multi-tier cache appliance can receive a first data item request for a data item. In response to the data item request, at step 510, the multi-tier cache appliance can determine that the data item is unavailable in neither the item-wise cache nor the block cache. At step 515, the multi-tier cache appliance can fetch the data item from a host server/data center to store in the item-wise cache. This step can be performed in response to step 510. Afterwards, at step 520, the multi-tier cache appliance can receive a second data item request for the data item.

At step 525, the multi-tier cache appliance can respond to the second data item request by locating the data item (e.g., fetched in step 515) in the item-wise cache. At step 530, the multi-tier cache appliance can update an access history of the data item in the primary data storage by incrementing an access count associated with the data item. In some embodiments, step 530 can occur in response to receiving the second data item request. In some embodiments, step 530 can occur in response to step 525.

At step 535, the multi-tier cache appliance can determine whether to write the data item into the block cache of the multi-tier cache appliance based on the access history of the data item. Determining whether to write the data item into the block cache can occur after, when, or in response to the RAM being beyond a threshold percentage (e.g., 80% or 90%) of being full. At step 540, the multi-tier cache appliance can store the data item a block buffer configured to be the size of a single block in the block cache. In several embodiments, blocks in the block cache all have the same size. Storing the data item in the block buffer can be in response to determining to write the data item in the block cache (e.g., step 535).

At step 545, the multi-tier cache appliance can write content of the block buffer into the block cache. For example, the multi-tier cache appliance can write the content of the block buffer into the block cache when the block buffer is full or substantially full. In some embodiments, the multi-tier cache appliance can maintain multiple block buffers in the primary data storage. When the block buffers are full or substantially full (e.g., according to a threshold percentage), the multi-tier cache appliance can sequentially write the content of the block buffers into the block cache.

Figure 6:
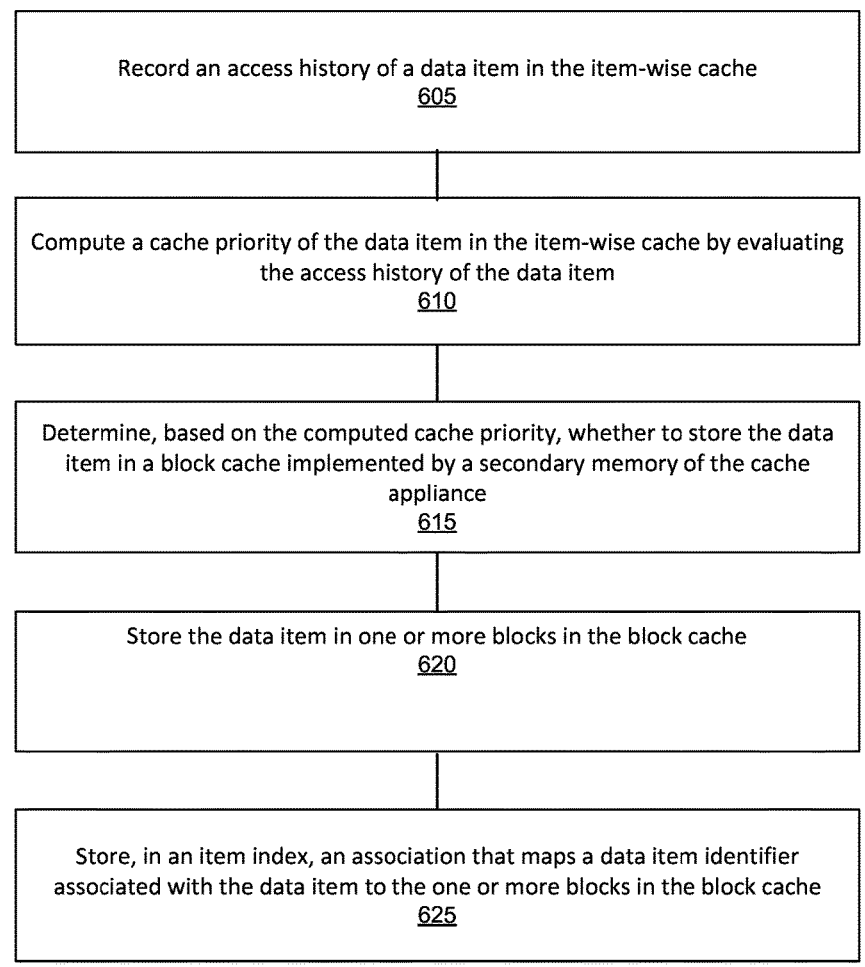
FIG. 6 is a flow chart illustrating a method of operating a multi-tier cache appliance to compute cache priority of a data item in an item-wise cache, in accordance with various embodiments.

FIG. 6 is a flowchart illustrating a method 600 of operating a multi-tier cache appliance (e.g., the cache appliance 300 of FIG. 3 and/or the cache appliance 400 of FIG. 4) to compute cache priority of a data item, in accordance with various embodiments. The multi-tier cache appliance can implement an item-wise cache (e.g., the item-wise cache 412 of FIG. 4) in a primary data storage (e.g., RAM memory) and a block cache (e.g., the block level memory space 406 of FIG. 4) in a secondary data storage (e.g., solid-state memory). The item-wise cache can be configured as a staging area for the block cache. The item-wise cache can be configured as a least recently used (LRU) cache.

At step 605, the multi-tier cache appliance can record an access history of a data item in the item-wise cache. The data item can be amongst multiple data items in the item-wise cache. For example, the multi-tier cache appliance can record access histories of all data items in the item wise cache. At step 610, the multi-tier cache appliance can compute a cache priority of the data item in the item-wise cache by evaluating the access history of the data item. In some embodiments, the multi-tier cache appliance can schedule a minimum evaluation period for the data item to be in the item-wise cache. In some embodiments, the multi-tier cache appliance can compute the cache priority after the minimum evaluation period enables the access history to collect, if any, a certain amount of accumulated data.

For example, the multi-tier cache appliance can compute the cache priority of the data item based on an access count, an access frequency within a time window, a requestor diversity measure, size of the data item, item type of the data item, or any combination thereof. In some embodiments, computing the cache priority includes computing the cache priority of the data item by evaluating the access history of the data item against at least an access history of another data item.

At step 615, the multi-tier cache appliance can determine, based on the computed cache priority, whether to store the data item in the block cache implemented by the secondary data storage. For example, the multi-tier cache appliance can determine to store the data item when the computed cache priority is beyond a predetermined threshold. In some embodiments, the multi-tier cache appliance determines whether to store the data item occurs when the item-wise cache is full or substantially full. In some embodiments, the multi-tier cache appliance determines whether to store the data item when the data item is about to be evicted from the item-wise cache (e.g., when the data item is a least recently requested data item in the item-wise cache).

At step 620, the multi-tier cache appliance can store the data item in one or more blocks in the block cache. For example, the multitier cache appliance can store the data item in response to determining that the data item is to be stored in the block cache. At step 625, the multi-tier cache appliance can store, in an item index, an association that maps a data item identifier associated with the data item to the one or more blocks in the block cache.

Figure 7:
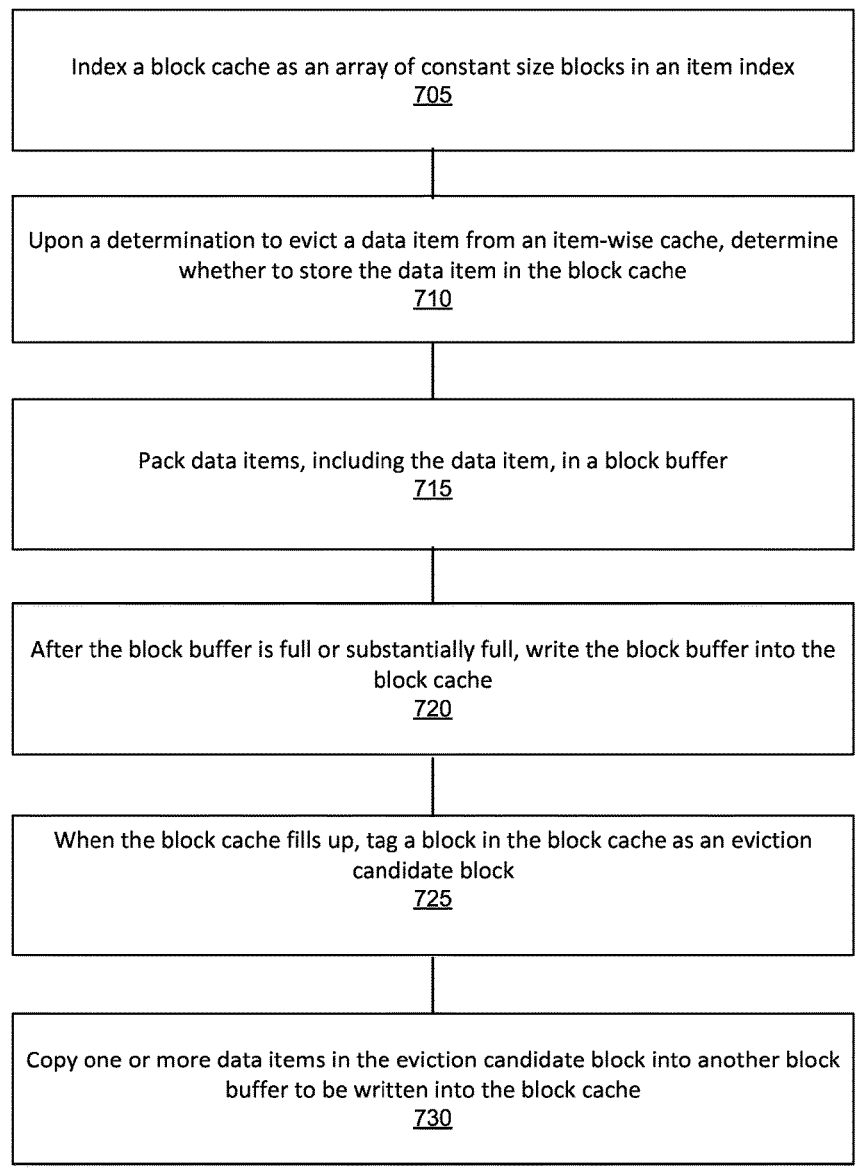
FIG. 7 is a flow chart illustrating a method of replacing blocks from a block cache in a cache appliance, in accordance with various embodiments.

FIG. 7 is a flowchart illustrating a method 700 of replacing blocks from a block cache (e.g., the block level memory space 406 of FIG. 4) in a cache appliance (e.g., the cache appliance 300 of FIG. 3 and/or the cache appliance 400 of FIG. 4), in accordance with various embodiments. The cache appliance can maintain the block cache in a secondary data storage (e.g., a solid-state drive). The cache appliance can also maintain an item-wise cache in a primary data storage (e.g., RAM memory). The item-wise cache can be configured as a staging area for the block cache. The item-wise cache can be configured as a least recently used (LRU) cache.

At step 705, the cache appliance can index the block cache as an array of constant-sized blocks. For example, the cache appliance can generate an item index that references the block cache according to its position in the array of constant-sized blocks. At step 710, the cache appliance can determine whether to store a data item in the block cache. For example, this determination can be made when the data item is about to be evicted from the item-wise cache. In the example of the LRU cache, the data item can become a candidate for eviction from the item-wise cache when the data item is the least recently used data item in the item-wise cache.

At step 715, the cache appliance can pack data items, including the data item from step 710, in a block buffer that is the same size as a single block in the block cache. The block buffer can be stored in the primary data storage. At step 720, after or in response to the block buffer being full or substantially full, the cache appliance can write the block buffer into the block cache. At step 725, when the block cache fills up, the cache appliance can tag a block (e.g., the least recently used block) in the block cache as an eviction candidate block. At step 730, the cache appliance can copy one or more data items in the eviction candidate block into another block buffer in the primary data storage to save the data items from eviction. The cache appliance can implement various methods to determine which data items in the eviction candidate block are most valuable, and thus deserve to be copied over and saved from eviction. Later when this other block buffer is full or substantially full, the cache appliance can write the other block buffer into a block in the block cache.

Figure 8:
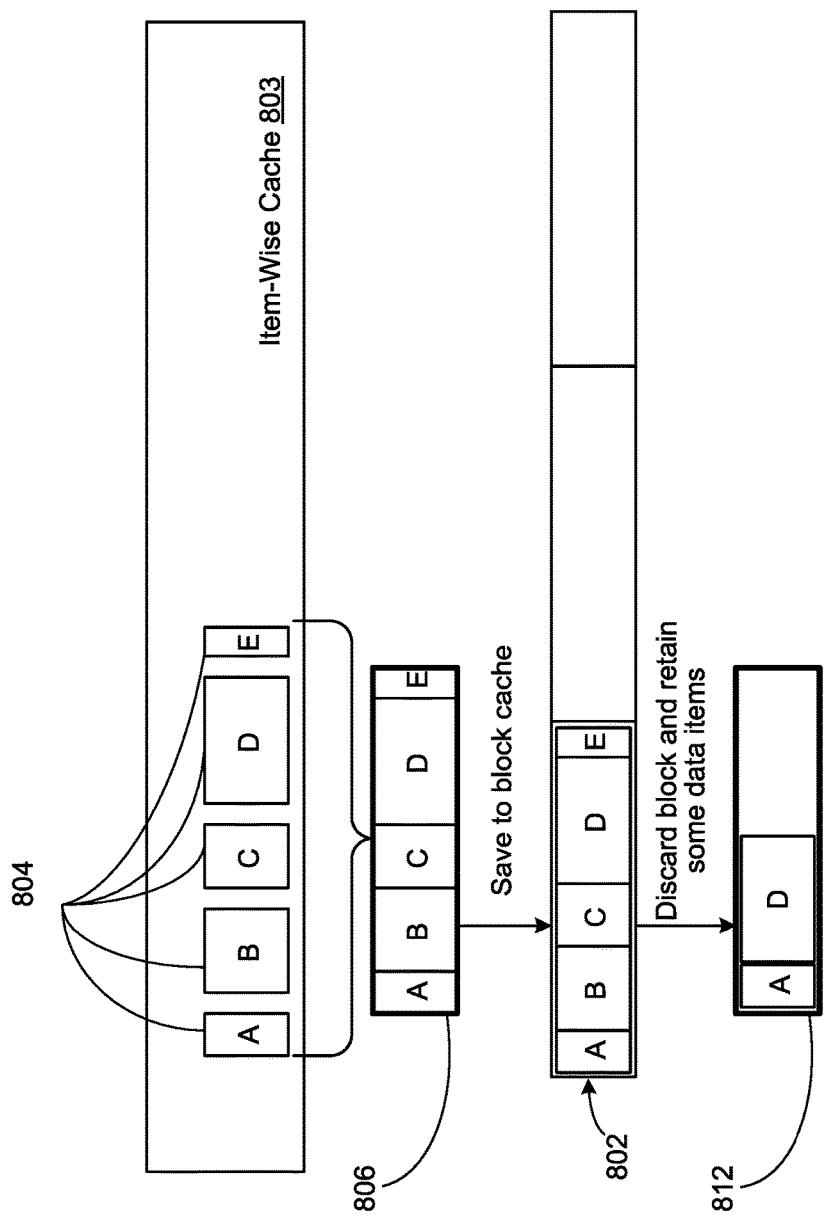
FIG. 8 is a data flow diagram illustrating maintenance of a block cache in a cache appliance, in accordance with various embodiments.

FIG. 8 is a data flow diagram illustrating maintenance of a block cache 802 in a cache appliance (e.g., the cache appliance 300 of FIG. 3 and/or the cache appliance 400 of FIG. 4), in accordance with various embodiments. The cache appliance can utilize an item-wise cache 803 as a staging area for the block cache 802. For example, the item-wise cache 803 can store data items 804 of various sizes. Upon eviction of a data item from the item-wise cache 803, the cache appliance can determine whether to add the data item into a block buffer 806. In the illustrated example, the cache appliance chooses to add (e.g., sequentially) the data items 804 to the block buffer 806. After the block buffer 806 is full or substantially full, the cache appliance can add the block buffer 806 into a block 810 in the block cache 802.

In some embodiments, as a mechanism to prevent unnecessary eviction, when the cache appliance evicts a block from the block cache 802, at least a subset of data items in the block cache 802 are saved back to a block buffer 812 (e.g., the block buffer 806 or another block buffer).

In some cases, a large number of data items are written to each block of the block cache 802. When a block is "evicted," not all of the data items in the block are evicted. For example, some data items in the block can be copied over to other blocks as they still need to be kept in the block cache 802. If a large portion of the block needs to be copied, then it can lead to a large number of wasted erases and writes. Accordingly, in several embodiments, the cache appliance implements caching strategies to evict blocks with the least number of data items that need to be copied over.

Figure 9:
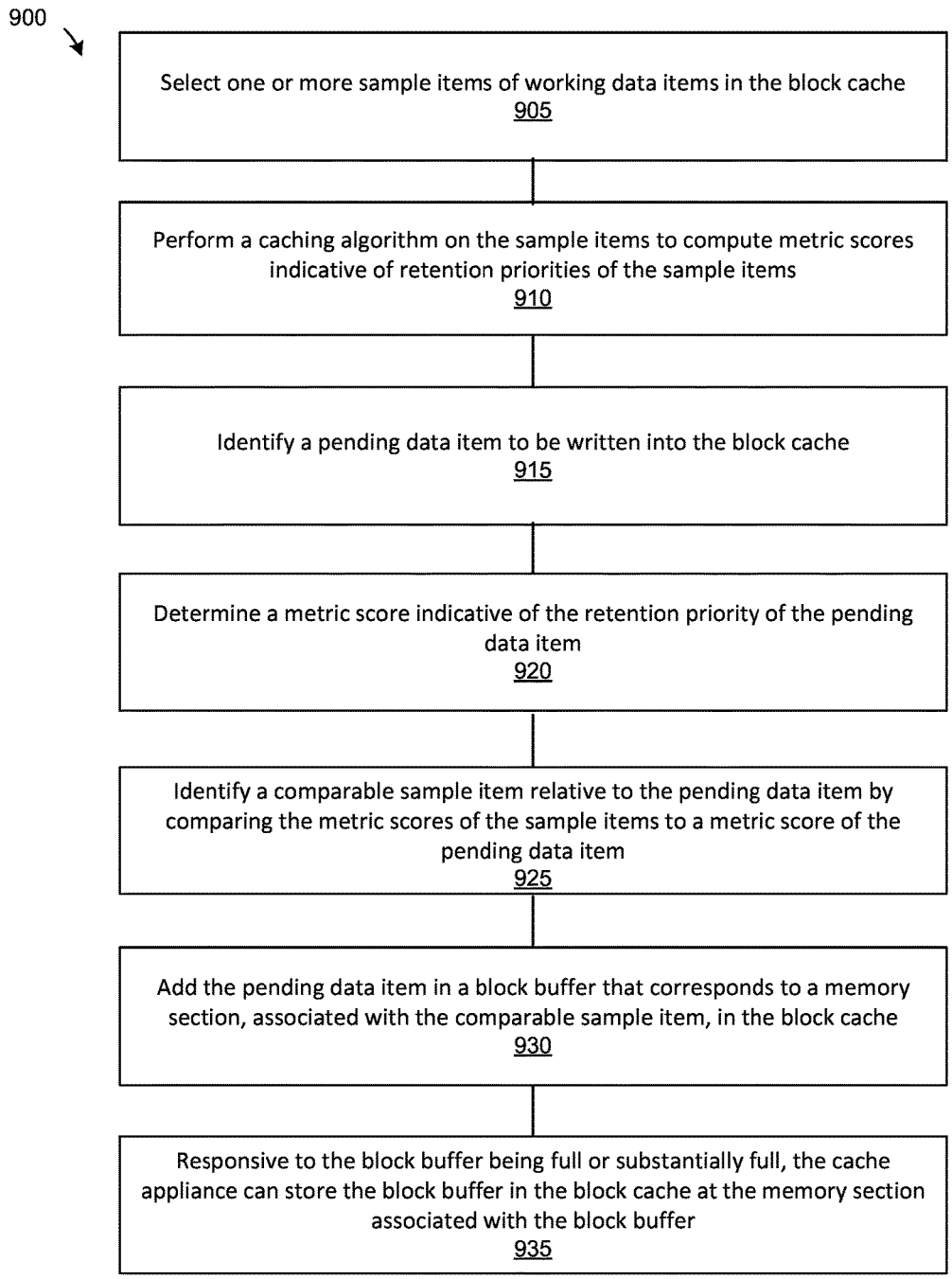
FIG. 9 is a flowchart illustrating a method of operating a cache appliance to schedule a data item to be added to a block in a block cache, in accordance with various embodiments.
Figure 10:
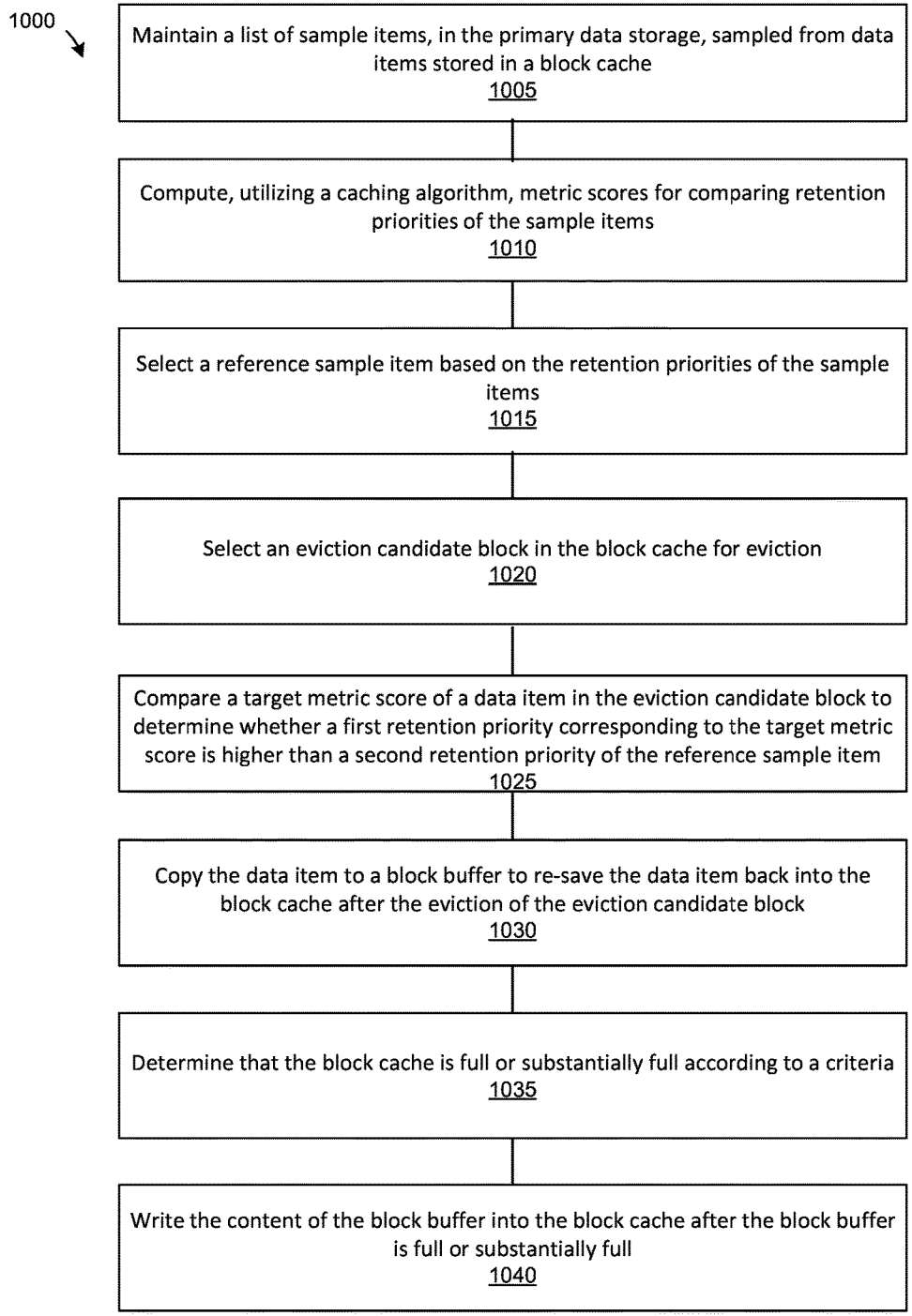
FIG. 10 is a flowchart illustrating a method of operating a cache appliance to retain at least a data item in a block when the block is being evicted from a block cache, in accordance with various embodiments.

The cache appliance can avoid storing data that change rapidly in the block cache 802 to avoid frequent writes (e.g., that may reduce the lifetime of the secondary data storage). Therefore, the cache appliance can store the body/content of a data item in the block cache, and keep an item index (e.g., in the primary data storage) along with information about when the data item is last accessed or how often is has been accessed. These metrics are used to determine whether the data item should be evicted from the block cache 802 or not. In some embodiments, caching algorithms keeps an ordered queue or list of these data items so that the worst items can be easily found and evicted from the block cache 802 when a new items needs to be cached. In some embodiments, when the cache appliance does not have sufficient memory or processing power to maintain an ordered queue of items, the cache appliance can emulate the ordered queue with an ordered queue of sample items as illustrated in FIG. 9 and FIG. 10. For example, instead of maintaining a full queue of items, the cache appliance can pick a subset of data items by performing a consistent hash on some attribute of the data items and then picking a portion of the data items based on the consistent hash.

FIG. 9 is a flowchart illustrating a method 900 of operating a cache appliance (e.g., the cache appliance 300 of FIG. 3 and/or the cache appliance 400 of FIG. 4) to schedule a data item to be added to a block in a block cache (e.g., the block level memory space 406 of FIG. 4), in accordance with various embodiments. The cache appliance can maintain the block cache in a secondary data storage (e.g., a solid-state drive). The cache appliance can also maintain an item-wise cache in a primary data storage (e.g., RAM memory). The item-wise cache can be configured as a staging area for the block cache. The item-wise cache can be configured as a least recently used (LRU) cache.

At step 905, the cache appliance can select one or more sample items of working data items in the block cache. At step 910, the cache appliance can perform a caching algorithm on the sample items to compute metric scores indicative of retention priorities of the sample items. In some embodiments, the metric scores correspond to timestamps. In some embodiments, the metric scores are monotonically increasing such that a first data item that has not been accessed is comparable to a second data item with a more recently updated metric score. These metric scores can be used to approximate an ordered queue of items when the cache appliance lacks the memory capacity or processor capacity to maintain such an ordered queue.

At step 915, the cache appliance can identify a pending data item to be written into the block cache. In some embodiments, the pending data item is an eviction candidate from the item-wise cache. That is, the cache appliance can determine whether a data item being evicted from the item-wise cache is to be stored in the block cache. At step 920, the cache appliance can determine a metric score (e.g., consistent with the caching algorithm) indicative of the retention priority of the pending data item.

At step 925, the cache appliance can identify a comparable sample item relative to the pending data item by comparing the metric scores of the sample items to a metric score of the pending data item. For example, the cache appliance can determine which of the sample items have the closest metric score to the metric score of the pending data item. The identification of the comparable sample item can thus define a relative retention priority position of the pending data item relative to the spectrum of retention priorities represented by the sample items.

At step 930, the cache appliance can add the pending data item in a block buffer that corresponds to a memory section, associated with the comparable sample item, in the block cache. The block buffer can be stored in the primary data storage of the cache appliance. For example, the cache appliance can assign memory sections in the block cache. Each memory section can correspond to a priority range (e.g., a range of retention priority) and at least one of the sample items that represent the priority range. In several embodiments, each memory section includes an insertion pointer that indicates where to place a new or replacement block to be written into the block cache at the memory section. At step 935, responsive to the block buffer being full or substantially full, the cache appliance can store the block buffer in the block cache at the memory section associated with the block buffer. In some embodiments, the sizes of the memory sections are fixed. In some embodiments, the size of the memory sections are variable and/or extendable.

FIG. 10 is a flowchart illustrating a method 1000 of operating a cache appliance (e.g., the cache appliance 300 of FIG. 3 and/or the cache appliance 400 of FIG. 4) to retain at least a data item in a block when the block is being evicted from a block cache (e.g., the block level memory space 406 of FIG. 4), in accordance with various embodiments. The cache appliance can maintain the block cache in a secondary data storage (e.g., a solid-state drive). The cache appliance can also maintain an item-wise cache in a primary data storage (e.g., RAM memory). The item-wise cache can be configured as a staging area for the block cache. The item-wise cache can be configured as a least recently used (LRU) cache.

At step 1005, the cache appliance can maintain a list of sample items, in the primary data storage, sampled from data items stored in a block cache implemented in the secondary data storage (e.g., similar to steps 905 and 910). In some embodiments, the cache appliance can sort the list of sample items as an ordered list according to respective metric scores of the sample items. At step 1010, the cache appliance can compute, utilizing a caching algorithm, metric scores for comparing retention priorities of the sample items.

At step 1015, the cache appliance can select a reference sample item based on the retention priorities of the sample items. In some embodiments, the cache appliance can select the reference sample item based on the retention priorities of a subset of the sample items that have a size within a pre-determined range (e.g., an intended target data size to evict from the block cache multiplied by the sampling rate). In one example, the cache appliance can select the reference sample item that has the highest metric score amongst the sample items or the subset of the sample items. In another example, the cache appliance can select the reference sample item that has the lowest metric score amongst the sample items or the subset of the sample items.

At step 1020, the cache appliance can select an eviction candidate block in the block cache for eviction. For example, the selection of the eviction candidate block can be in response to determining that the block cache is full or substantially full. In some embodiments, the cache appliance can select the eviction candidate block by selecting the eviction candidate block that contains the reference sample item that has the lowest retention priority, according to the metric scores, amongst at least a portion of the sample items. In other embodiments, the cache appliance can select the candidate block based on block access statistics.

At step 1025, the cache appliance can compare a target metric score of a data item in the eviction candidate block to determine whether a first retention priority corresponding to the target metric score is higher than a second retention priority of the reference sample item according to a comparable metric score of the reference sample item. At step 1030, the cache appliance can copy the data item to a block buffer (e.g., maintained in the primary data storage) to re-save the data item back into the block cache after the eviction of the eviction candidate block. At step 1035, the cache appliance can determine that the block cache is full or substantially full according to a criteria. At step 1040, the cache appliance can write the content of the block buffer into the block cache after the block buffer is full or substantially full.

Figure 11:
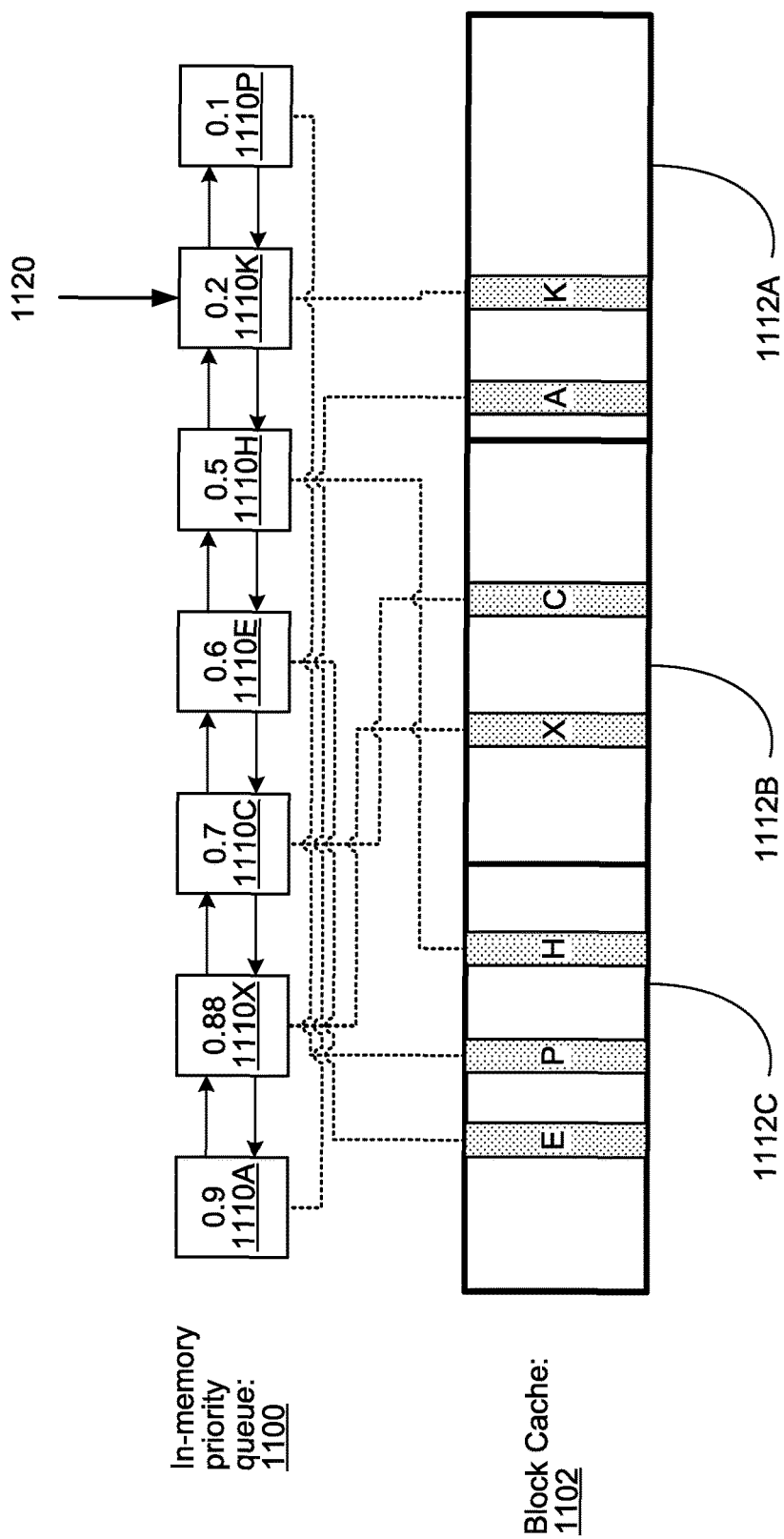
FIG. 11 is a block diagram illustrating a data structure of a sampled in-memory priority queue relative to a block cache, in accordance with various embodiments.

FIG. 11 is a block diagram illustrating a data structure of a sampled in-memory priority queue 1100 relative to a block cache 1102, in accordance with various embodiments. A cache appliance (e.g., the cache appliance 300 of FIG. 3 and/or the cache appliance 400 of FIG. 4) can maintain the sampled in-memory priority queue 1100 in its primary memory (e.g., RAM). The cache appliance can maintain the block cache 1102 in a secondary memory (e.g., a flash drive or other solid-state drive). The sampled in-memory priority queue 1100 includes an ordered queue of sample items 1110 that are stored in the block cache 1102. In some embodiments, the cache appliance can sample the data items in the block cache 1102 according to a sample rate to produce the ordered queue of sample items (e.g., by performing a consistent hash of the data items in the block cache). For example, the sample items include a sample item 1110A, a sample item 1110X, a sample item 1110C, a sample item 1110E, a sample item 1110H, a sample item 1110K, and a sample item 1110P, collectively as the "sample items 1110." The block cache 1102 also includes the sample items 1110. The block cache 1102 includes a first block 1112A, a second block 1112B, and a third block 1112C, collectively as the "blocks 1112."

The cache appliance can calculate metric scores of the sample items 1110 based on a caching algorithm. The sample items 1110 can be ordered based on the respective metric scores that are indicative of retention priorities of the sample items 1110. For example, the sample item 1110A can have a metric score of 0.9; the sample item 1110X can have a metric score of 0.8; the sample item 1110C can have a metric score of 0.7; the sample item 1110E can have a metric score of 0.6; the sample item 1110 H can have a metric score of 0.5; and the sample item 1110K can have a metric score of 0.2; the sample item 1110P can have a metric score of 0.1. In some embodiments, the metric scores are inversely proportional to retention priorities and proportional to eviction priorities. In some embodiments, the metric scores are inversely proportional to eviction priorities and proportional to retention priorities.

The cache appliance can maintain an eviction pointer 1120 to the sample item with the lowest retention priority (e.g., highest eviction priority) according to the metric score that should be evicted. In some embodiments, the eviction pointer 1120 points to the sample item with the lowest retention priority amongst a subset of the sample items 1110 that satisfy an eviction criteria. For example, the eviction criteria may be a target size of the sample item to evict. In the illustrated example, the sample item 1110K can have the lowest retention priority amongst the subset of the sample item 1110 that satisfy the target size. The cache appliance can calculate the target size as a total target size to evict from the block cache 1102 multiplied by the sample rate that produced the sample items 1110.

Figure 12:
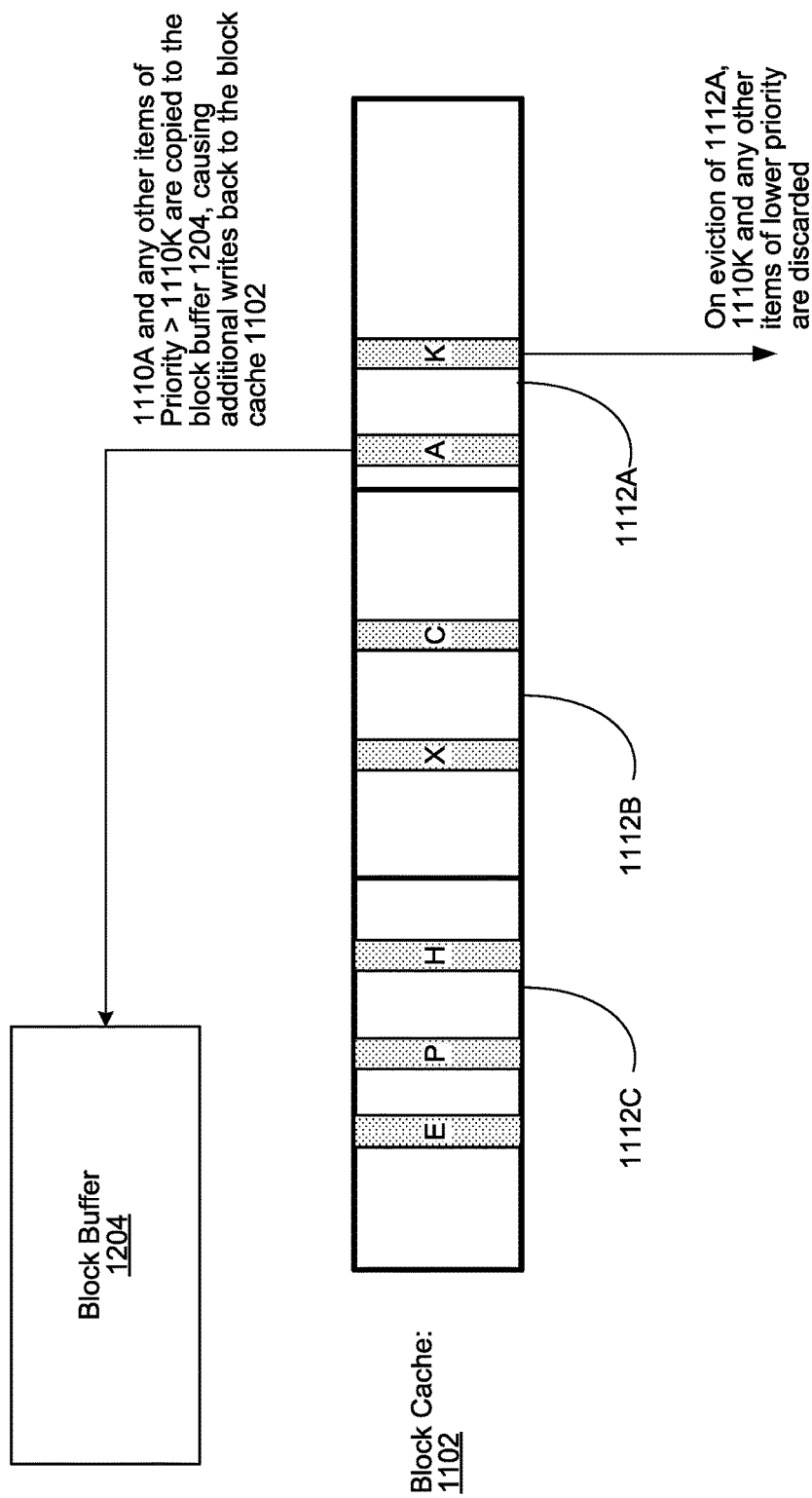
FIG. 12 is a block diagram illustrating retention of a data item in an eviction candidate block when the eviction candidate block is being evicted from the block cache of FIG. 11, in accordance with various embodiments.

FIG. 12 is a block diagram illustrating retention of a data item in an eviction candidate block when the eviction candidate block is being evicted from the block cache 1102 of FIG. 11, in accordance with various embodiments. A cache appliance (e.g., the cache appliance 300 of FIG. 3 and/or the cache appliance 400 of FIG. 4) can maintain a block buffer 1204 (e.g., an insertion buffer) in its primary memory (e.g., RAM). The cache appliance can maintain the block cache 1102 in a secondary memory (e.g., a flash drive or other solid-state drive).

In the illustrated example, the block cache 1102 includes the first block 1112A, the second block 1112B, and the third block 1112C. The illustrated example illustrates eviction of the first block 1112A. The first block 1112A includes the sample item 1110A and the sample item 1110K. Upon eviction, the cache appliance can check whether any of the data items in the first block 1112A has a retention priority higher than that of a target eviction sample item selected by the cache appliance. In the illustrated case, the sample item 1110K is the target eviction sample item selected by the cache appliance. Accordingly, any data item within the first block 1112A (e.g., being a sample item or otherwise) having a higher retention priority than the retention priority of the target eviction sample item is copied into the block buffer 1204. Otherwise, any data item within the first block 1112A having the same or lower retention priority than the retention priority of the target eviction sample item is discarded when the first block 1112A is replaced or erased.

While processes or blocks are presented in a given order in flow charts of this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification.

What is claimed is:

1. A computer-implemented method, comprising:
   emulating item-wise caching for a block cache implemented in a secondary data storage of a caching system by:
      selecting, as sample items, a subset of data items included in the block cache; and
      maintaining the sample items in an ordered queue on a primary data storage of the caching system, wherein:
         the sample items are ordered in the ordered queue based on a caching algorithm that computes a metric score for each of the sample items and determines an order for the sample items based on a comparison of the metric scores; and
         each metric score is indicative of a retention priority;
   identifying, from an item-wise cache implemented in the primary data storage, a pending data item for storage into the block cache;
   determining a metric score, indicative of retention priority, of the pending data item;
   comparing the metric score of the pending data item with the metric scores of the sample items in the ordered queue and identifying a comparable sample item from the sample items with a metric score that is closest to the metric score of the pending data item;
   adding the pending data item into a block buffer that is stored in the primary data storage, wherein:
      the block buffer corresponds to a memory section in the block cache implemented in the secondary data storage; and
      the memory section in the block cache is associated with the comparable sample item; and
   when adding the pending data item into the block buffer either results in the block buffer being full or a threshold percentage of being full, storing the block buffer, from the primary data storage, into the block cache, implemented in the secondary data storage, at the memory section that corresponds to the block buffer.

2. The computer-implemented method of claim 1, wherein the item-wise cache serves as a staging area for the block cache.

3. The computer-implemented method of claim 2, wherein identifying the pending data item for storage into the block cache comprises:
   determining that the item-wise cache is full or a threshold percentage of being full; and
   in response to determining that the item-wise cache is full or a threshold percentage of being full, identifying the pending data item as an eviction candidate from the item-wise cache.

4. The computer-implemented method of claim 1, wherein:
   the block cache comprises a plurality of memory sections; and
   each of the plurality of memory sections corresponds to (1) a priority range, and (2) at least one sample item, from the subset of data items selected as the sample items, that represents the priority range.

5. The computer-implemented method of claim 4, wherein each of the plurality of memory sections in the block cache includes an insertion pointer that indicates where to place, in that particular memory section of the plurality of the memory sections, a new or replacement block when the new or replacement block is to be written into the block cache.

6. A caching system, comprising:
   a secondary data storage configured to implement a block cache that stores data in units of constant-sized block;
   a primary data storage configured to implement an item-wise cache; and
   a processor configured to:
      emulate item-wise caching for a block cache implemented in a secondary data storage of a caching system by:

selecting, as sample items, a subset of data items included in the block cache; and maintaining the sample items in an ordered queue on the primary data storage, wherein:

the sample items are ordered in the ordered queue based on a caching algorithm that computes a metric score for each of the sample items and determines an order for the sample items based on a comparison of the metric scores; and each metric score is indicative of a retention priority;

identify, from the item-wise cache, a pending data item for storage into the block cache;

determine a metric score, indicative of retention priority, of the pending data item;

compare the metric score of the pending data item with the metric scores of the sample items to identify a comparable sample item from the sample items with a metric score that is closest to the metric score of the pending data item;

add the pending data item into a block buffer that is stored in the primary data storage, wherein:

the block buffer corresponds to a memory section in the block cache implemented in the secondary data storage; and the memory section in the block cache is associated with the comparable sample item; and when adding the pending data item into the block buffer either results in the block buffer being full or a threshold percentage of being full, store the block buffer, from the primary data storage, into the block cache, implemented in the secondary data storage, at the memory section that corresponds to the block buffer.

7. The caching system claim 6, wherein the caching algorithm comprises at least one of a multiple-queue caching algorithm, a segmented least recently used (SLRU) caching algorithm, a 2-way set associative least recently used caching (2LRU) algorithm, an adaptive replacement cache (ARC) algorithm, or a Greedy Dual Frequency Size (GDFS) algorithm.

8. The caching system of claim 6, wherein:

the primary data storage represents a random access memory (RAM);

the secondary data storage represents a solid state drive; and the block cache in the solid state drive is adapted to be accessible only via block identifiers.

9. A non-transitory computer-readable data storage medium storing computer-executable instructions that, when executed, cause a computer system to perform a computer-implemented method, the method comprising:

emulating item-wise caching for a block cache implemented in a secondary data storage of a caching system by:

selecting, as sample items, a subset of data items included in the block cache; and maintaining the sample items in an ordered queue on a primary data storage of the caching system, wherein:

the sample items are ordered in the ordered queue based on a caching algorithm that computes a metric score for each of the sample items and determines an order for the sample items based on a comparison of the metric scores; and each metric score is indicative of a retention priority;

identifying, from an item-wise cache implemented in the primary data storage, a pending data item for storage into the block cache;

determining a metric score, indicative of retention priority, of the pending data item;

comparing the metric score of the pending data item with the metric scores of the sample items in the ordered queue and identifying a comparable sample item from the sample items with a metric score that is closest to the metric score of the pending data item;

adding the pending data item into a block buffer that is stored in the primary data storage, wherein:

the block buffer corresponds to a memory section in the block cache implemented in the secondary data storage; and the memory section in the block cache is associated with the comparable sample item; and when adding the pending data item into the block buffer either results in the block buffer being full or a threshold percentage of being full, storing the block buffer, from the primary data storage, into the block cache, implemented in the secondary data storage, at the memory section that corresponds to the block buffer.

10. The non-transitory computer-readable data storage medium of claim 9, wherein the item-wise cache serves as a staging area for the block cache.

11. The non-transitory computer-readable data storage medium of claim 10, wherein identifying the pending data item for storage into the block cache comprises:

determining that the item-wise cache is full or a threshold percentage of being full; and in response to determining that the item-wise cache is full or a threshold percentage of being full, identifying the pending data item as an eviction candidate from the item-wise cache.

12. The non-transitory computer-readable data storage medium of claim 9, wherein:

the block cache comprises a plurality of memory sections;

each of the plurality of memory sections corresponds to (1) a priority range, and (2) at least one sample item, from the subset of data items selected as the sample items, that represents the priority range.

13. The non-transitory computer-readable data storage medium of claim 12, wherein each of the plurality of memory sections in the block cache includes an insertion pointer that indicates where to place, in that particular memory section of the plurality of memory sections, a new or replacement block when the new or replacement block is to be written into the block cache.

\* \* \* \* \*